March 23, 1971 R. M. GRAHAM ET AL 3,572,090
APPARATUS AND METHOD FOR TESTING PAPERBOARD
Filed June 3, 1968

INVENTORS
RICHARD M. GRAHAM
GORDON C. WHEELER
BY
Robert A. Beck
ATTORNEY

United States Patent Office 3,572,090
Patented Mar. 23, 1971

3,572,090
APPARATUS AND METHOD FOR TESTING PAPERBOARD
Richard M. Graham, Concord, and Gordon C. Wheeler, Walnut Creek, Calif., assignors to Fibreboard Corporation, San Francisco, Calif.
Filed June 3, 1968, Ser. No. 734,144
Int. Cl. G01m 3/26; G01n 5/02
U.S. Cl. 73—73           5 Claims

ABSTRACT OF THE DISCLOSURE

A device for measuring the rate at which liquids are absorbed into the cut edge of paperboard comprises mating top and bottom sections which engage a sample of paperboard at their peripheral edges and form an internal chamber with only a continuous cut edge of the paperboard exposed to liquid in the chamber. A source of liquid is provided to fill the chamber and a calibrated capillary tube is provided so that the rate of absorption may be determined by measuring the time required for a given amount of liquid to be absorbed.

BACKGROUND OF THE INVENTION

Many liquid and liquid containing products are presently packaged in cartons made of paperboard which has been coated on its surfaces with a barrier material such as plastic, wax or metallic foil. Since the barrier material is normally applied to the paperboard sheet before the carton blanks are cut therefrom, the cut edges are not protected by barrier material. If the paperboard is particularly susceptible to liquid penetration, liquid from the product may enter the internal cut edges of the paperboard carton causing weakening or failure of the carton.

It is therefore advantageous for a carton manufacturer to be able to determine, prior to application of a barrier material, if a supply of paperboard resists penetration of liquid into cut edges sufficiently so that it may safely be used to form cartons for liquid containing products.

Present test methods either involve measurement of the absorption of liquid into the paperboard surface, which is clearly measurement of a different property of the paperboard, or require submersion of a sample with barrier coating on both surfaces in liquid and measurement of liquid absorption into the cut edges. The latter method not only requires a barrier coated sample but is subject to error since air entrapped within the sample cannot escape and thus builds up pressure resisting penetration of the liquid into the board.

It is an object of this invention to provide a method and apparatus whereby the rate at which liquid is absorbed into the cut edge of a paperboard sheet can be quickly and accurately determined.

It is a further object of the invention to provide a method and apparatus whereby the rate at which liquid is absorbed into the cut edge of a paperboard sheet may be determined either before or after a barrier material is applied to the surface of the sheet.

Further and more specific objects of the invention will become apparent from the following description and accompanying drawings wherein.

PREFERRED EMBODIMENT

Figure 1:
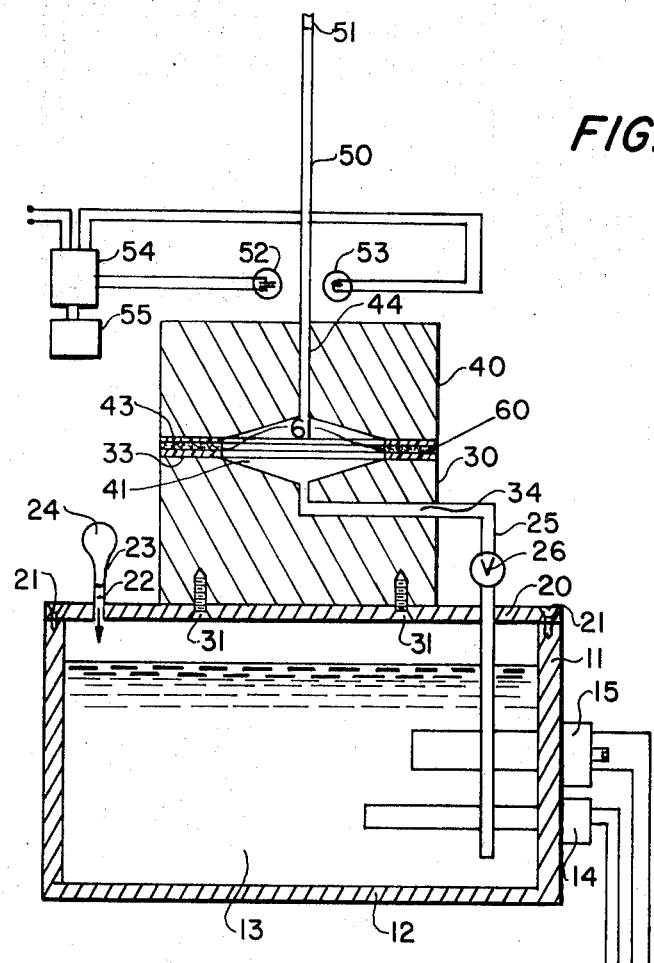
FIG. 1 is a schematic, cross sectional view of the apparatus.
Figure 2:
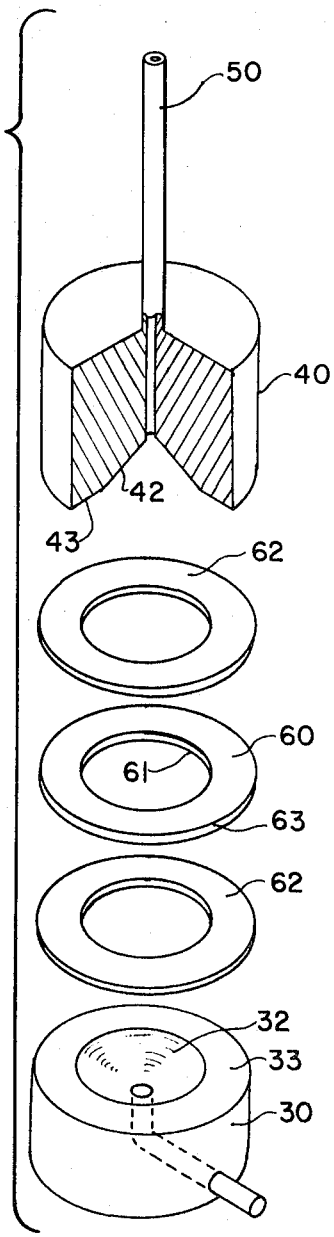
FIG. 2 is an exploded isometric view of a subassembly of the FIG. 1 apparatus with the upper component thereof sectioned for clarification purposes.
Figure 3:
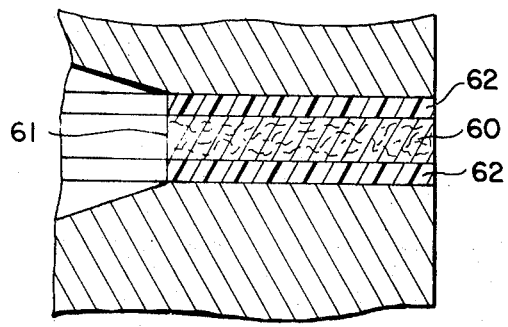
FIG. 3 is an enlarged fragmentary view of a sample testing arrangement employed in the FIG. 1 apparatus.

The testing device illustrated schematically in FIG. 1 comprises a hollow base in which four walls 11 and bottom 12 form a liquid well 13. The well contains a reservoir of liquid. A heater 14 and a thermoswitch 15 extend through a wall 11 into the liquid in the well to allow control of the temperature of the liquid. Thermoswitch 15 is connected to heater 14 through relay 16 so that when the temperature of the liquid in well 13 drops below the desired point heater 14 is automatically turned on and remains on until the temperature is properly adjusted, whereupon it is turned off by thermoswitch 15. If desired, more sophisticated methods of temperature control such as cooling modules and heat sinks may be employed.

The liquid well is closed by a top plate 20 which may be attached to the base by screws 21. A passageway 22 extends through the top plate and connects to hollow tube 23. Attached to the tube 23 is a conventional laboratory bulb pump 24. A second hollow tube 25 extends from within the liquid in well 13 through top plate 20. A valve 26 is provided to control liquid flow through tube 25.

A tester bottom section 30, preferably cylindrical in shape, is attached to top plate 20 by screws 31. A hollowed out portion in the center of the top of tester bottom section 30 forms a bottom central cavity portion 32. This center cavity portion is preferably circular in horizontal cross section and is surrounded by a flat smooth continuous top surface 33 of specific width. A passage 34 leads from the bottom of central cavity portion 32 to the side edge of tester bottom 30 where it is connected to tube 23 leading to the liquid supply in well 13.

A tester top section 40 is also preferably of cylindrical shape and has a top central cavity portion 42 formed in the bottom surface thereof, circumscribed by a flat, smooth continuous bottom surface 43. Bottom surface 43 and mating top surface 33 are identical in shape and dimension. A passageway 44 leads from the top of central cavity portion 42 to the top surface of tester top section 40 where it connects with calibrated capillary tube 50 which extends vertically upwardly from top section 40. Thus when top section 40 is mounted on section 30 with a test sample 60 therebetween, surfaces 33 and 43 are mating in the sense that they contact the taped surface of the sample 60 over its entire area. Central cavity portions 32 and 42 form an interior chamber 41 for liquid which will contact the interior cut edge 61 of sample 60.

At a suitable distance above the bottom of the calibrated capillary tube 50 the tube is marked at 51 to indicate the level to which the tester should be filled to begin testing a paperboard sample. A photocell 52 is mounted beside capillary tube 50 at a predetermined distance below mark 51. This distance is selected so that the amount of liquid in the capillary tube between the mark 51 and photocell 52 will be absorbed into the paperboard within a measurable period of time, for instance between about 500 seconds for highly absorptive board and 2000 seconds for board resistant to absorption. Mounted opposite photocell 52 is light source 53, and both are connected to photocell relay 54, which is turn is connected to timer 55.

Thus when the tester is in operation and the liquid level in capillary tube 50 falls below photocell 52, light from light source 53 strikes photocell 52 activating photocell relay 54 to stop timer 55, which has previously been started by hand.

METHOD OF OPERATION

A sample 60 of the paperboard to be tested is cut into a doughnut shape corresponding in size and shape to mating top surface 33 and bottom surface 43. It is particularly important that the inside circumference of the sample correspond exactly to the circumference of chamber 41 so that only the interior cut edge 61 of sample 60 contacts the liquid in the chamber. If the liquid is allowed to contact surfaces of sample 60 the test results may not truly represent the absorptivity of the cut edge.

Two pieces of non-absorptive pressure sensitive tape 62, which is coated with adhesive on both surfaces, are cut to the same dimensions as the surfaces of sample 60 and one piece of tape is adhered to each surface thereof. The combined tape and sample is then adhered to top surface 33 and top section 40 is then mounted on top of the sample and tape and pressure is applied to insure overall adherence. Care must be exercised during sample insertion so that interior cut edge 61 of sample 60 coincides with the interior edges of top surface 33 and bottom surface 43 so that liquid in chamber 41 will contact only the cut edge 61 of the sample. It should be noted that exterior cut edge 63 of sample 60 is exposed to the atmosphere to allow free egress of air from the sample as liquid is absorbed into cut edge 61.

After the sample is mounted in the device, valve 26 is opened. Air is pumped into well 13 by laboratory bulb pump 24 forcing liquid through tube 25 and passage 34 to fill chamber 41, passageway 44 and calibrated capillary tube 50 up to mark 51. Valve 26 is closed and timer 55 is then started. Thereafter the test proceeds automatically. When liquid absorption has occurred to the degree that the level of liquid has fallen the predetermined distance in capillary tube 50, light source 53 activates photocell 52 and photocell relay 54 stops timer 55. The operator need not be in attendance during the entire test. He can merely return at some later time to record the timer reading.

If the paperboard available for testing is so thin that absorption times are very long, a composite sample may be used. Two or more samples 60 may be joined by layers of non-absorptive tape to form a composite sample of the desired thickness.

The type of liquid used in the tester may be selected to characterize the type which is to be contained in the carton, for example water, 10% lactic acid solution, fruit juice or the like.

Variables which influence the rate at which liquid is absorbed into the cut edge of a piece of paperboard in the device are the head of liquid above the absorbing surface, the temperature of the liquid, the type of liquid used, the area of the cut edge exposed to the liquid and, of course, the absorptive properties of the sample itself.

In use of this testing device, it has been found that if the tests are started with the same head of liquid above the absorbing surface, the change in head during the test does not materially affect the validity of resuls.

Variations in temperature are eliminated by the temperature control, and for any given set of samples, the same type of liquid will be used.

Since the area of the cut edge exposed to the liquid is directly proportional to the thickness of the sample, the time required to absorb a given amount of liquid is inversely proportional to the sample thickness. Thus, to compare absorptivity of a 0.040 inch thick sample with a 0.020 inch sample, the absorption time of the 0.040 inch sample need only be multiplied by two.

Although the dimensions of the testing device are not critical it has been found that a chamber with an inside diameter of 1¼ inches and a capillary tube which provides a liquid head of 220 millimeters above the absorbing surface are preferred. The capillary tube may have an inside diameter of 0.05 millimeter.

In a series of tests with this size testing device, using a sample with a thickness of 0.060 inch, and a 10% lactic acid solution as the liquid, and with the photocell set to activate when 0.045 milliliter of liquid has been absorbed, it has been found that paperboard with an absorptive time of over 1000 seconds is generally acceptable for packaging of milk products, while paperboard with an absorptive time of less than 1000 seconds is generally unacceptable.

An alternative method of using the testing device is to allow absorption of liquid into the cut edge of the sample for a specific time period and measure the amount of liquid absorbed. The amount absorbed will be a relative measurement of the absorptivity of the sample.

What is claimed is:

1. An apparatus for determining the rate at which a liquid is absorbed into paperboard or the like comprising, means forming a chamber adapted to contain a predetermined amount of liquid, means for supplying liquid to said chamber, means for maintaining a sample to be tested with only a cut edge of said sample exposed to the liquid in said chamber and means operatively associated with said chamber for measuring the rate at which said predetermined amount of liquid changes as liquid is absorbed into said cut edge.

2. The invention of claim 1 wherein said means for measuring comprises a calibrated capillary tube and photoelectric means.

3. The invention of claim 1 further comprising a sample maintained in said apparatus and wherein a second cut edge of said sample is exposed to the atmosphere.

4. In an apparatus for measuring the rate of liquid absorption into the cut edge of paperboard, the combination of top and bottom sections which form a chamber, mating contact surfaces on said sections, a sample, means for maintaining said sample with only a single continuous cut edge thereof exposed to the interior of said chamber, a liquid supply source, means for conducting liquid from said supply source into said chamber, and a calibrated capillary tube connected to the interior of said chamber for measuring the rate at which liquid is absorbed by said sample.

5. A method of measuring the rate at which liquid is absorbed into the cut edge of paperboard or the like comprising, providing a supply of liquid, exposing only a single, continuous cut edge of a sample to said liquid and measuring the rate at which liquid is absorbed into said cut edge.

References Cited

UNITED STATES PATENTS

| 1,660,024 | 2/1928 | Abrams | 73—38 |
| 2,601,840 | 7/1952 | Smith | 73—46X |
| 3,485,085 | 12/1969 | Hawkins | 73—46 |
| 966,078 | 8/1910 | Bowman | 73—38 |
| 2,217,175 | 8/1940 | Ledbetter | 73—73X |
| 3,034,336 | 5/1962 | Upshur | 73—38 |

FOREIGN PATENTS

| 363,456 | 11/1922 | Germany | 73—46 |
| 260,203 | 10/1926 | Great Britain | 73—46 |

RICHARD C. QUEISSER, Primary Examiner

C. E. SNEE III, Assistant Examiner

U.S. Cl. X.R.

73—38